US008638389B2

(12) United States Patent
Namba et al.

(10) Patent No.: US 8,638,389 B2
(45) Date of Patent: Jan. 28, 2014

(54) POWER SUPPLY CIRCUIT, INTEGRATED CIRCUIT DEVICE, SOLID-STATE IMAGING APPARATUS, AND ELECTRONIC APPARATUS

(75) Inventors: Kazuhide Namba, Kanagawa (JP); Akira Chokki, Kanagawa (JP)

(73) Assignee: Sony Corporation, Tokyo (JP)

( * ) Notice: Subject to any disclaimer, the term of this patent is extended or adjusted under 35 U.S.C. 154(b) by 342 days.

(21) Appl. No.: 13/090,485

(22) Filed: Apr. 20, 2011

(65) Prior Publication Data

US 2011/0292259 A1 Dec. 1, 2011

(30) Foreign Application Priority Data

May 26, 2010 (JP) ................. 2010-120198

(51) Int. Cl.
*H04N 5/335* (2011.01)
*G05F 1/10* (2006.01)

(52) U.S. Cl.
USPC .......................................... 348/372; 396/301

(58) Field of Classification Search
USPC ............... 348/372; 396/301–304; 361/86, 90, 361/91.1; 323/282–284
See application file for complete search history.

(56) References Cited

U.S. PATENT DOCUMENTS

| | | | | |
|---|---|---|---|---|
| 4,025,935 A * | 5/1977 | Wagensonner et al. | ....... | 396/301 |
| 5,323,100 A * | 6/1994 | Iketani | ........................... | 320/135 |
| 5,809,315 A * | 9/1998 | Ohtsuka | ........................ | 713/323 |
| 6,650,833 B1 * | 11/2003 | Oda et al. | ........................ | 396/89 |
| 7,046,293 B1 * | 5/2006 | Nagase | ........................ | 348/372 |
| 7,466,355 B2 * | 12/2008 | Takami | ........................ | 348/312 |
| 2002/0025160 A1 * | 2/2002 | Shimada et al. | ............ | 396/277 |
| 2003/0020821 A1 * | 1/2003 | Watanabe et al. | ............. | 348/312 |
| 2004/0021787 A1 * | 2/2004 | Cho | ............................. | 348/308 |
| 2004/0046457 A1 * | 3/2004 | Dumont et al. | ................ | 307/72 |
| 2005/0116692 A1 * | 6/2005 | Sugiyama | ..................... | 323/222 |
| 2005/0189932 A1 * | 9/2005 | Itoh | ............................... | 323/283 |
| 2006/0012249 A1 * | 1/2006 | Kobayashi et al. | ............. | 307/11 |
| 2008/0278129 A1 * | 11/2008 | Shimizu | ........................ | 323/282 |
| 2009/0256540 A1 * | 10/2009 | Yang et al. | .................... | 323/282 |

FOREIGN PATENT DOCUMENTS

JP 2006-060978 3/2006

* cited by examiner

*Primary Examiner* — James Hannett
*Assistant Examiner* — Dwight C Tejano
(74) *Attorney, Agent, or Firm* — Sheridan Ross P.C.

(57) ABSTRACT

A power supply circuit includes: a comparison unit that compares a reference voltage and an input voltage and outputs a voltage difference signal; an output voltage generating unit that generates an output voltage based on the voltage difference signal; an input voltage generating unit that generates the input voltage based on the output voltage; a current output unit that outputs a reference current; a resistor that generates the reference voltage in accordance with the reference current; and a capacitor that is connected to the resistor in parallel and is charged by the reference current, wherein the current output unit allows the reference current at the time of startup to be lower than the reference current during an operation.

13 Claims, 12 Drawing Sheets

FIG.5

| SECOND SWTr (54) | FIRST SWTr (53) | Tr for R (23) | Tr for C (24) |
|---|---|---|---|
| | | | |
| Vref<Vs | ON | OFF | ON | OFF |
| Vref>Vs | ON or OFF (DEPENDING ON RESULT OF OUT) | ON | ON | OFF |

POWER SUPPLY CIRCUIT, INTEGRATED CIRCUIT DEVICE, SOLID-STATE IMAGING APPARATUS, AND ELECTRONIC APPARATUS

BACKGROUND OF THE INVENTION

1. Field of the Invention

The present invention relates to a power supply circuit that outputs stable voltage, an integrated circuit device, a solid-state imaging apparatus, and an electronic apparatus.

2. Description of the Related Art

In order to output a desired output voltage, a power supply circuit compares the output voltage with a reference voltage and controls the On/Off of an output switching device such as an output transistor such that the output voltage is in correspondence with the reference voltage.

In such power supply circuits, a PWM (Pulse Width Modulation) control method in which the output switching device is controlled to be On or Off in a digital manner, a comparator method in which the output switching device is controlled to be On or Off, and the like are widely known. As the power supply circuits, there are a step-up type in which a voltage higher than an input voltage is output and a step-down type in which a voltage lower than an input voltage is output.

In the PWM control method, the output switching device is controlled to be On or Off in accordance with a control signal having the pulse width so as to be in correspondence with an electric potential difference, for example, during a period in which the output voltage is lower than the reference voltage.

In the comparator method, the output switching device is controlled to be in the On state until the output voltage is above the reference voltage, for example, in a case where the output voltage is below the reference voltage.

In addition, as the comparator method, for example, there is a hysteresis control method in which the reference voltage is controlled such that the reference voltage used when the output voltage is higher than the reference voltage is higher than that used when the output voltage is lower than the reference voltage by using a hysteresis comparator (see JP-A-2006-060978).

In the power supply circuits using such methods, there are cases where a soft-start circuit that slowly raises the reference voltage to be compared with the output voltage at the time of startup is disposed.

By disposing the soft-start circuit, generation of a large electric potential difference between the reference voltage and the output voltage in the power supply circuit immediately after the startup can be prevented.

In addition, in the soft-start circuit, a time constant circuit is used, in which a capacitor or the like is used (JP-A-2006-060978).

SUMMARY OF THE INVENTION

However, in a case where the soft-start circuit using a capacitor is added to the power supply circuit as above, it is necessary to use a capacitor having high capacitance according to a necessary soft-start period.

Since the capacitance of the capacitor is in proportion to the area, the circuit size of the power supply circuit is increased, so that, for example, the area occupied by the power supply circuit in an integrated circuit is increased.

Thus, it is desirable that the increase in the circuit size of the power supply circuit due to the soft-start circuit is suppressed.

According to an embodiment of the present invention, there is provided a power supply circuit including: a comparison unit that compares a reference voltage and an input voltage and outputs a voltage difference signal; an output voltage generating unit that generates an output voltage based on the voltage difference signal; an input voltage generating unit that generates the input voltage based on the output voltage; a current output unit that outputs a reference current; a resistor that generates the reference voltage in accordance with the reference current; and a capacitor that is connected to the resistor in parallel and is charged by the reference current. The current output unit allows the reference current at the time of startup to be lower than the reference current during an operation.

According to another embodiment of the present invention, there is provided an integrated circuit device including: a power supply circuit that outputs an output voltage; and a power-receiving circuit to which the output voltage is fed. The power supply circuit includes a comparison unit that compares a reference voltage and an input voltage and outputs a voltage difference signal, an output voltage generating unit that generates an output voltage based on the voltage difference signal, an input voltage generating unit that generates the input voltage based on the output voltage, a current output unit that outputs a reference current, a resistor that generates the reference voltage in accordance with the reference current, and a capacitor that is connected to the resistor in parallel and is charged by the reference current. The current output unit allows the reference current at the time of startup to be lower than the reference current during an operation.

According to still another embodiment of the present invention, there is provided a solid-state imaging apparatus including: a pixel array unit, in which a plurality of pixel circuits are two-dimensionally arranged, that outputs analog pixel signals of the pixel circuits; a column circuit that converts the analog pixel signals into digital pixel signals; a digital processing unit that performs a digital process for the digital pixel signals; an output control unit that outputs the digital pixel signals for which the digital process has been performed; and a power supply circuit that outputs an output voltage to at least one of the pixel array unit, the column circuit, the digital processing unit, and the output control unit. The power supply circuit includes a comparison unit that compares a reference voltage and an input voltage and outputs a voltage difference signal, an output voltage generating unit that generates an output voltage based on the voltage difference signal, an input voltage generating unit that generates the input voltage based on the output voltage, a current output unit that outputs a reference current, a resistor that generates the reference voltage in accordance with the reference current, and a capacitor that is connected to the resistor in parallel and is charged by the reference current. The current output unit allows the reference current at the time of startup to be lower than the reference current during an operation.

According to yet another embodiment of the present invention, there is provided an electronic apparatus including: a power supply circuit that outputs an output voltage; and a power-receiving circuit to which the output voltage is fed. The power supply circuit includes a comparison unit that compares a reference voltage and an input voltage and outputs a voltage difference signal, an output voltage generating unit that generates an output voltage based on the voltage difference signal, an input voltage generating unit that generates the input voltage based on the output voltage, a current output unit that outputs a reference current, a resistor that generates the reference voltage in accordance with the reference current, and a capacitor that is connected to the resistor in parallel and is charged by the reference current. The current output unit allows the reference current at the time of startup to be lower than the reference current during an operation.

According to the embodiments of the present invention, at the time of startup, the capacitor is charged by a current that is lower than the reference current during the operation.

Therefore, according to the embodiments of the present invention, a long soft start period can be acquired while the capacitance of the capacitor is to a small value.

According to the embodiment of the present invention, the increase in the circuit size of the power supply circuit due to the soft-start circuit can be suppressed.

BRIEF DESCRIPTION OF THE DRAWINGS

FIG. 5 is a diagram illustrating the operations of various switching-operation transistors when the operation of the power supply circuit shown in FIG. 1 is started.

DESCRIPTION OF THE PREFERRED EMBODIMENTS

Hereinafter, embodiments of the present invention will be described with reference to the accompanying drawings.

The description will be presented in the following order.
1. First Embodiment (Example of Power Supply Circuit 1)
2. Second Embodiment (First Example of Solid-state Imaging Apparatus 2)
3. Third Embodiment (Second Example of Solid-state Imaging Apparatus 2)
4. Fourth Embodiment (Third Example of Solid-state Imaging Apparatus 2)
5. Fifth Embodiment (Another Example of Power Supply Circuit 1)
6. Sixth Embodiment (Example of Imaging Apparatus 3)
<. First Embodiment>
[Configuration of Power Supply Circuit 1]

Figure 1:
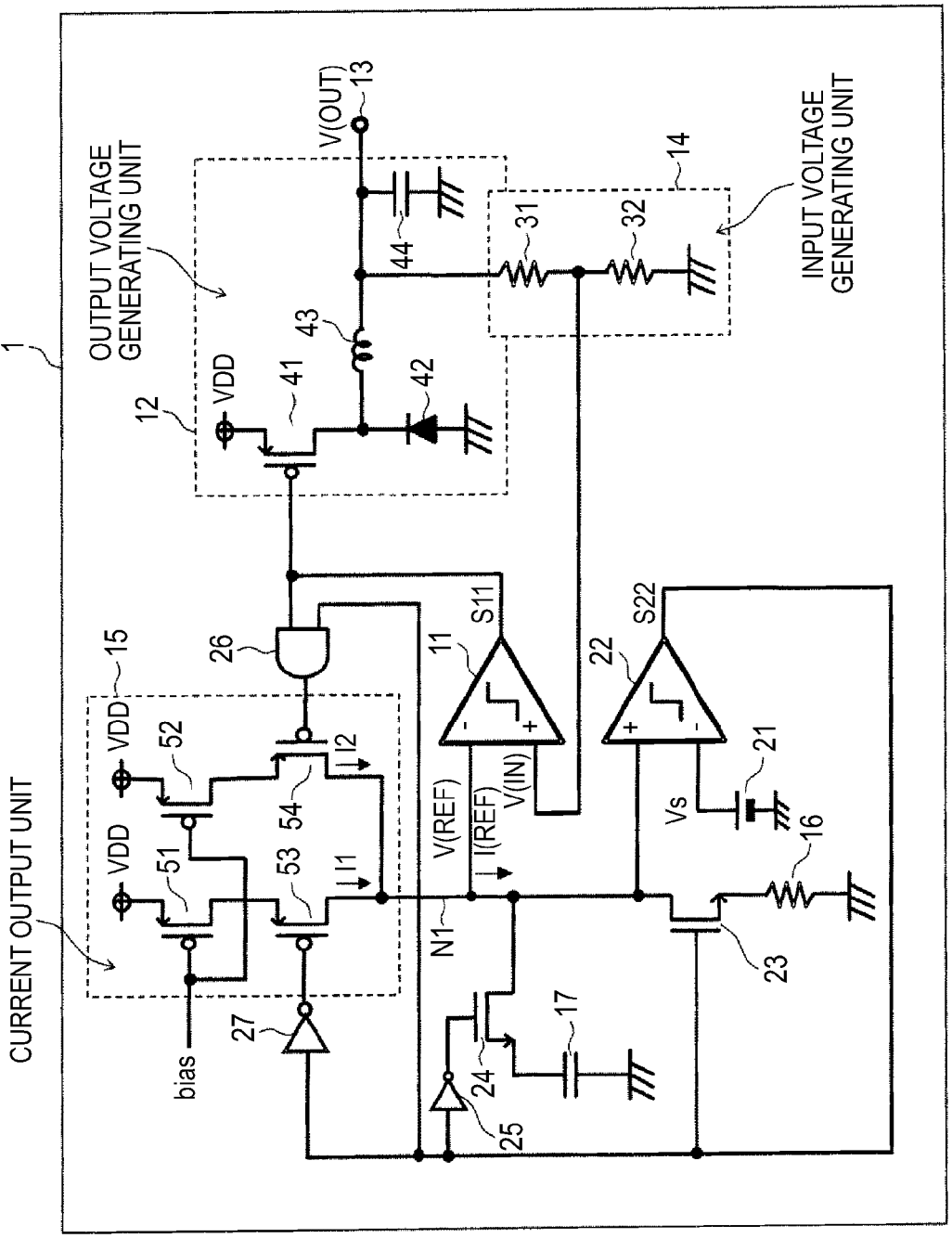
FIG. 1 is a circuit diagram of a power supply circuit according to a first embodiment of the present invention.

FIG. 1 is a circuit diagram of a power supply circuit 1 according to a first embodiment of the present invention.

The power supply circuit 1 shown in FIG. 1 includes a main comparator 11, an output voltage generating unit 12, a power output terminal 13, an input voltage generating unit 14, a current output unit 15, a resistor 16, and a slow-start capacitor 17.

The power supply circuit 1 shown in FIG. 1 compares, in the main comparator 11, a reference voltage V(REF) applied to a node N1 and the input voltage V(IN) that is based on the output voltage V(OUT) and controls the output voltage V(OUT) such that the input voltage V(IN) is the reference voltage V(REF).

The power supply circuit 1 outputs the output voltage V(OUT) from the power output terminal 13.

In addition, the power supply circuit 1 shown in FIG. 1 includes a determination voltage generating unit 21, a switching comparator 22, a resistor-connected transistor 23, a capacitor-connected transistor 24, a capacitor inverter 25, a power source logic circuit 26, and a power source inverter 27.

The power supply circuit 1 shown in FIG. 1 realizes a slow start function of slowly raising the reference voltage V(REF) at the time of startup by allowing the main comparator 11 to have a hysteresis characteristic by using the circuits of the control system.

Compared with a power supply circuit using a PWM control method, the power supply circuit 1 using the hysteresis control method includes advantages that the response speed is high, it is difficult to oscillate, and the configuration is simple although it has a relatively large ripple component of the output voltage.

Here, the entirety of the power supply circuit 1 shown in FIG. 1 is integrated on a semiconductor substrate not shown in the figure and is implemented as a part of the integrated circuit on the semiconductor substrate.

The input voltage generating unit 14 has a first voltage dividing resistor 31 and a second voltage dividing resistor 32.

The first voltage dividing resistor 31 and the second voltage dividing resistor 32 are, for example, formed by a wiring layer or a diffusion layer of the integrated circuit.

The first voltage dividing resistor 31 has one end connected to the power output terminal 13 and the other end connected to one end of the second voltage dividing resistor 32. The other end of the second voltage dividing resistor 32 is connected to the ground of the substrate.

In addition, the input voltage generating unit 14 generates an input voltage V(IN) by dividing the output voltage V(OUT) by using the first voltage dividing resistor 31 and the second voltage dividing resistor 32.

The main comparator 11 includes an inverted input node (−), a non-inverted input node (+), and an output node.

The main comparator 11 can be formed by, for example, a differential amplifier that is formed on the semiconductor substrate.

The inverted input node (−) is connected to the node N1, and the reference voltage V(REF) is input thereto.

The non-inverted input node (+) is connected to the reference voltage V(REF) generating unit, and the input voltage V(IN) is input thereto.

The main comparator 11 compares the input voltage V(IN) with the reference voltage V(REF) and outputs a voltage difference signal S11 according to a voltage difference between the reference voltage V(REF) and the input voltage V(IN).

For example, in a case where the input voltage V(IN) is lower than the reference voltage V(REF), the main comparator 11 outputs a voltage difference signal S11 of a low level.

On the other hand, in a case where the input voltage V(IN) is higher than the reference voltage V(REF), the main comparator 11 outputs a voltage difference signal S11 of a high level.

The output voltage generating unit 12 includes an output transistor 41, a diode 42, an inductor 43, and a smoothing capacitor 44.

The output transistor 41, for example, is a PMOS transistor that is formed on the semiconductor substrate.

The output transistor 41 has the drain connected to the power source VDD of the substrate, the source connected to the cathode of the diode 42 and one end of the inductor 43, and the gate connected to the output node of the main comparator 11.

The diode 42, for example, is formed by a PN junction of the semiconductor substrate and has a characteristic of allowing a current to flow from the anode to the cathode.

The anode of the diode 42 is connected to the ground of the substrate.

The inductor 43, for example, is formed by a wiring layer or an interlayer via of the integrated circuit, or wire bonding or an externally-attached inductor of the package.

The other end of the inductor 43 is connected to the power output terminal 13 and one end of the smoothing capacitor 44.

The smoothing capacitor 44, for example, is formed by two-layer wiring layers of the integrated circuit.

The smoothing capacitor 44 has one end connected to the power output terminal 13 and the other end connected to the ground of the substrate.

When the voltage difference signal S11 of the low level is input from the main comparator 11, the output transistor 41 is in the On state.

In such a case, a current flows from the power source VDD of the substrate to the smoothing capacitor 44 through the output transistor 41 and the inductor 43, whereby the smoothing capacitor 44 is charged.

The charged voltage of the smoothing capacitor 44 rises while having a ripple component based on the characteristics of a resonance circuit configured by the inductor 43 and the smoothing capacitor 44.

The charged voltage of the smoothing capacitor 44 is output from the power output terminal 13.

On the other hand, when the voltage difference signal S11 is in the high level, the output transistor 41 is in the Off state.

For example, in a case where a circuit to be supplied with power is connected to the power output terminal 13, the circuit to be supplied with power uses electric charge accumulated in the smoothing capacitor 44 as a current.

Accordingly, the charged voltage of the smoothing capacitor 44, that is, the output terminal V(OUT) drops.

The current output unit 15 includes a main current-source transistor 51, a sub current-source transistor 52, a main switching transistor 53, and a sub switching transistor 54.

The main current-source transistor 51 and the sub current-source transistor 52, for example, are PMOS transistors formed on the semiconductor substrate.

Each of the main current-source transistor 51 and the sub current-source transistor 52 has the drain connected to the power source VDD of the substrate and the gate connected to a bias circuit not shown in the figure.

Accordingly, each of the main current-source transistor 51 and the sub current-source transistor 52 supplies a current in accordance with an electric potential difference between the bias voltage and the power source voltage VDD.

However, the main current-source transistor 51 supplies a current that is higher than a current that is supplied by the sub current-source transistor 52 to the node N1.

For example, the main current-source transistor 51 may supply 75 microamperes, and the sub current-source transistor 52 may supply 1.6 microamperes.

Hereinafter, the current supplied by the main current-source transistor 51 is called a first current I1, and the current supplied by the sub current-source transistor 52 is called a second current I2.

The main switching transistor 53, for example, is a PMOS transistor that is formed on the semiconductor substrate.

The main switching transistor 53 has the drain connected to the source of the main current-source transistor 51, the source connected to the node N1, and the gate connected to the output node of the power source inverter 27.

When the low level is input, the main switching transistor 53 is in the On state. On the other hand, when the high level is input, the main switching transistor 53 is in the Off state.

In the case of the On state, the main switching transistor 53 supplies the first current I1 to the node N1.

The sub switching transistor 54, for example, is a PMOS transistor that is formed on the semiconductor substrate.

The sub switching transistor 54 has the drain connected to the source of the sub current-source transistor 52, the source connected to the node N1, and the gate connected to the output node of the power source logic circuit 26.

When the low level is input, the sub switching transistor 54 is in the On state. On the other hand, when the high level is input, the sub switching transistor 54 is in the Off state.

In the case of the On state, the sub switching transistor 54 supplies the second current I2 to the node N1.

Hereinafter, the current supplied to the node N1 by the current output unit 15 through the main switching transistor 53 and the sub switching transistor 54 is referred to as a reference current I(REF).

The current value of the reference current I(REF) changes in accordance with the On/Off states of the main switching transistor 53 and the sub switching transistor 54.

The resistor 16, for example, is formed on the wiring layer or the diffusion layer of the integrated circuit.

The resistor-connected transistor 23, for example, is an NMOS transistor that is formed on the semiconductor substrate.

The resistor-connected transistor 23 has the source connected to the node N1, the drain connected to one end of the resistor 16, and the gate connected to the output node of the switching comparator 22.

The other end of the resistor 16 is connected to the ground of the substrate.

Accordingly, in a case where the resistor-connected transistor 23 is in the On state, the resistor 16 is connected to the node N1. In addition, the reference current I(REF), which is output by the current output unit 15, flows through the resistor 16 so as to generate the reference voltage V(REF).

The slow-start capacitor 17, for example, is formed by two-layer wiring layers of the integrated circuit.

The capacitor-connected transistor 24, for example, is an NMOS transistor that is formed on the semiconductor substrate.

The capacitor-connected transistor 24 has the source connected to the node N1, the drain connected to one end of the slow-start capacitor 17, and the gate connected to the output node of the capacitor inverter 25.

The capacitor-connected transistor 24 is connected to the ground of the substrate.

Accordingly, in a case where the capacitor-connected transistor 24 is in the On state, the capacitor-connected transistor 24 is connected to the node N1. The capacitor-connected transistor 24 is connected to the resistor 16 in parallel.

The capacitor-connected transistor 24 is charged by the reference current I(REF) that is output by the current output unit 15.

The capacitor-connected transistor 24 is charged at a charging speed according to the current value of the reference current I(REF) and the capacitance of the capacitor-connected transistor 24.

The determination voltage generating unit 21 is, for example, a voltage circuit generating a constant voltage.

The determination voltage generating unit 21 generates a determination voltage Vs.

The determination voltage Vs may be a voltage that is lower than the reference voltage V(REF) in the operation state after startup.

The switching comparator 22 includes an inverting input node (−), a non-inverting input node (+), and an output node.

The switching comparator 22, for example, can be formed by a differential amplifier that is formed on the semiconductor substrate.

The non-inverting input node (+) is connected to the node N1, and the reference voltage V(REF) is input thereto.

The inverting input node (−) is connected to the determination voltage generating unit 21, and the determination voltage Vs is input thereto.

The switching comparator 22 compares the reference voltage V(REF) and the determination voltage Vs and outputs a determination signal S22 according to a voltage difference between the reference voltage V(REF) and the determination voltage Vs, from the output node.

For example, in a case where the reference voltage V(REF) is lower than the determination voltage Vs, the switching comparator 22 outputs the determination signal S22 of the low level.

On the other hand, in a case where the reference voltage V(REF) is higher than the determination voltage Vs, the switching comparator 22 outputs the determination signal S22 of the high level.

The output node of the switching comparator 22 is connected to the input nodes of the capacitor inverter 25 and the power source inverter 27.

The capacitor inverter 25 inverts the determination signal S22 and outputs a resultant signal to the capacitor-connected transistor 24.

In addition, the power source inverter 27 inverts the determination signal S22 and outputs a resultant signal to the main switching transistor 53.

The power source logic circuit 26, for example, is a circuit of the logical product of two inputs.

The power source logic circuit 26 has one input node to which the output node of the main comparator 11 is connected and the other input node to which the output node of the switching comparator 22 is connected.

In a case where both the voltage difference signal S11 and the determination signal S22 are in the high level, the power source logic circuit 26 outputs a logical product signal of the high level to the sub switching transistor 54.

In other cases, the power source logic circuit 26 outputs the logical product signal of the low level.

[Hysteresis Operation]

Figure 2:
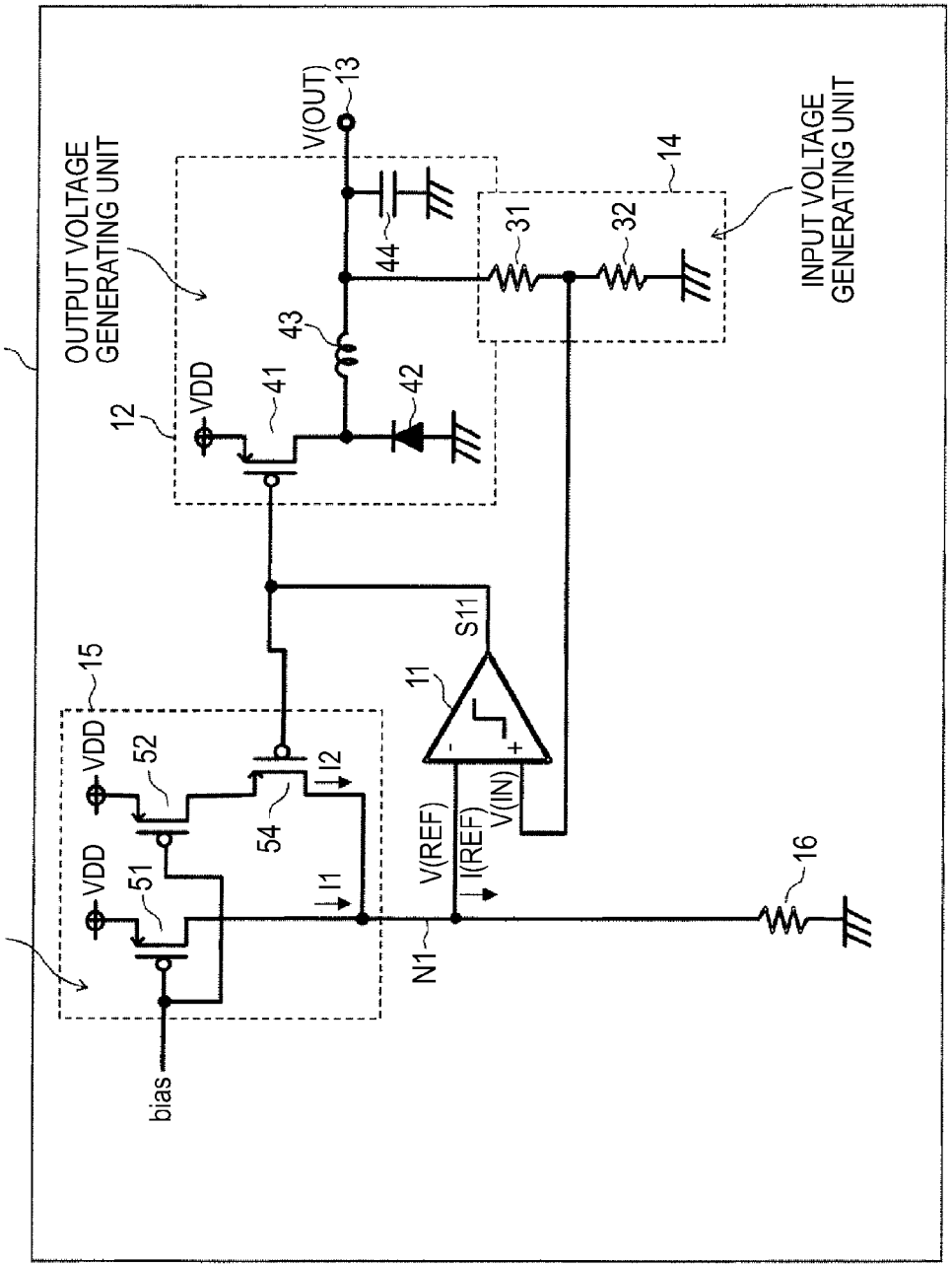
FIG. 2 is a circuit diagram of a portion of the power supply circuit, which is shown in FIG. 1, relating to a hysteresis function.

FIG. 2 is a circuit diagram of a portion of the power supply circuit 1, which is shown in FIG. 1, relating to a hysteresis function.

When the power supply circuit 1 is started up so as to be in the state in which the output voltage V(OUT) is a voltage that approximately corresponds to the reference voltage V(REF), the resistor-connected transistor 23 and the power source inverter 27 are maintained to be in the On State, and the capacitor-connected transistor 24 is maintained to be in the Off state.

In addition, since the capacitor inverter 25 outputs a determination signal S22 of the high level, a state is formed in which the signal level of the voltage difference signal S11 of the main comparator 11 is directly input to the sub switching transistor 54.

Figure 3:
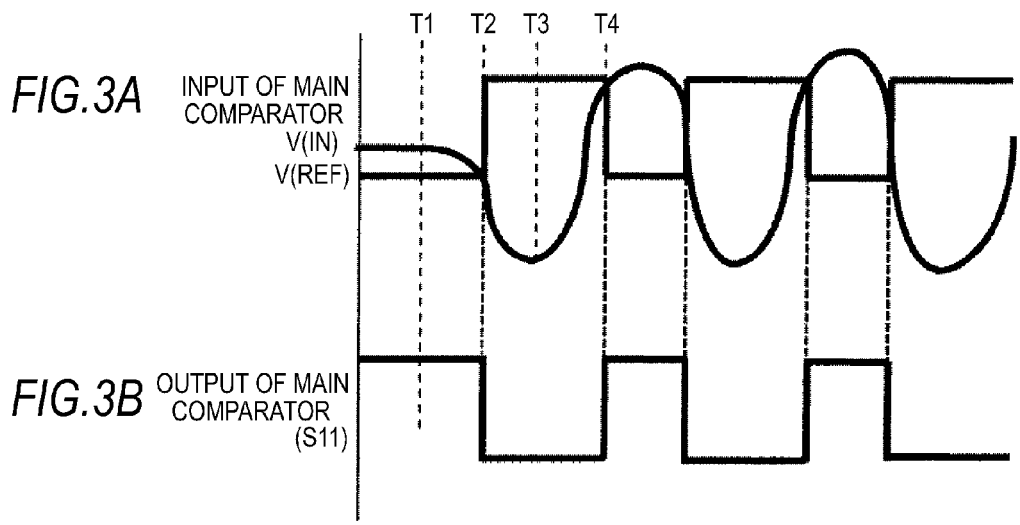
FIGS. 3A and 3B are timing charts of the hysteresis operation of the power supply circuit shown in FIG. 1.

FIGS. 3A and 3B are timing charts of the hysteresis operation of the power supply circuit 1 shown in FIG. 1.

FIG. 3A illustrates waveforms of the reference voltage V(REF) and the input voltage V(IN) that are input to the main comparator 11. FIG. 3B is a waveform of a voltage signal that is output from the main comparator 11.

At timing T1 shown in FIG. 3A, the input voltage V(IN) is higher than the reference voltage V(REF).

In this case, the main comparator 11 outputs a voltage difference signal S11 of the high level.

In a case where the voltage difference signal S11 is in the high level, the sub switching transistor 54 is in the Off state. Accordingly, only the first current I1 flows though the resistor 16 out of the first current I1 and the second current I2. The reference voltage V(REF) comes to have a voltage value according to the first current I1 only.

In addition, in a case where the voltage difference signal S11 is in the high level, the output transistor 41 is in the Off state. Accordingly, the smoothing capacitor 44 is not charged and outputs a voltage that has been charged in advance.

At timing T2, the input voltage V(IN) is lower than the reference voltage V(REF).

In this case, the main comparator 11 changes the voltage difference signal S11 from the high level to the low level.

When the voltage difference signal S11 is in the low level, the sub switching transistor 54 is in the On state. Accordingly, the first current I1 and the second current I2 flow through the resistor 16. The reference voltage V(REF) comes to have a higher voltage value than a voltage according to the first current I1 only.

In addition, when the voltage difference signal S11 is in the low level, the output transistor 41 is in the On state. Accordingly, the smoothing capacitor 44 is charged.

As a result, as illustrated at timing T3, the input voltage V(IN) also rises in accordance with the charging of the smoothing capacitor 44.

At timing T4, the input voltage V(IN) is higher than the reference voltage V(REF) that is in the high voltage state.

In this case, the main comparator 11 changes the voltage difference signal S11 from the low level to the high level.

When the voltage difference signal S11 is in the high level, the sub switching transistor 54 is in the Off state. Accordingly, only the first current I1 flows through the resistor 16. The reference voltage V(REF) comes to have a low voltage according to only the first current I1 again.

In addition, when the voltage difference signal S11 is in the high level, the output transistor 41 is in the Off state. Accordingly, the smoothing capacitor 44 is not charged.

Through the above-described operations, the power supply circuit 1 shown in FIG. 1 compares the input voltage V(IN) with the reference voltages V(REF) of different voltage levels in a case where the input voltage V(IN) changes from the high level to the low level and in a case where the input voltage V(IN) changes from the low level to the high level.

In addition, the power supply circuit 1 controls the On/Off of the output transistor 41 based on a result of the comparison.

Accordingly, the main comparator 11 has hysteresis characteristics.

[Slow-Start Operation]

Figure 4:
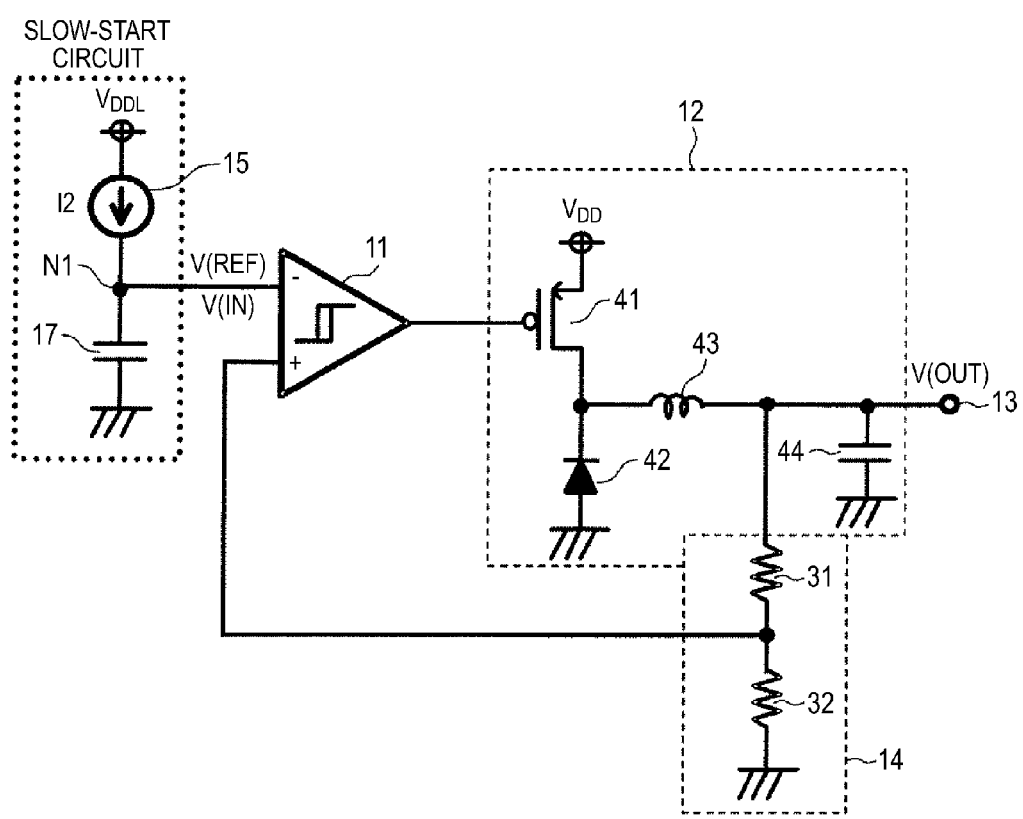
FIG. 4 is a diagram illustrating a slow-start operation.

FIG. 4 is a diagram illustrating a slow-start operation.

In the diagram illustrated in FIG. 4, a slow-start circuit is connected to the non-inverted input node (+) of the main comparator 11.

This slow-start circuit includes a current source and a slow-start capacitor 17. The current source corresponds to the current output unit 15 shown in FIG. 1.

When the power supply circuit 1 shown in FIG. 4 is started up, the current source outputs a current so as to charge the slow-start capacitor 17.

The charged voltage of the slow-start capacitor 17 slowly rises in accordance with the current supplied from the current source.

The main comparator 11 compares the reference voltage V(REF) that slowly rises after the startup with the input voltage V(IN).

In a case where the input voltage V(IN) is lower than the reference voltage V(REF), the main comparator 11 outputs a voltage difference signal S11 of the low level so as to control the output transistor 41 to be in the On state. When the output transistor 41 is in the On state, the smoothing capacitor 44 is charged.

On the other hand, in a case where the input voltage V(IN) is higher than the reference voltage V(REF), the main comparator 11 controls the output transistor 41 to be in the Off state. The charging of the smoothing capacitor 44 is stopped.

As above, the main comparator 11 repeats charging and discharging of the smoothing capacitor 44 in accordance with the reference voltage V(REF) that slowly rises after the startup.

As a result, the current flowing in the smoothing capacitor 44 through the output transistor 41 also decreases.

In contrast to this, for example, in a case where the slow-start capacitor 17 shown in FIG. 4 is replaced by a resistor 16, the reference voltage V(REF) has a predetermined voltage value immediately after the startup of the power supply circuit 1.

In this case, the main comparator 11 maintains the output transistor 41 to be in the On state until the input voltage V(IN) is higher than the reference voltage V(REF).

In addition, the smoothing capacitor 44 is charged at once in accordance with a large current (inrush current).

FIG. 5 is a diagram illustrating the operations of various switching-operation transistors when the operation of the power supply circuit 1 shown in FIG. 1 is started.

In FIG. 5, a sub switching transistor 54, a main switching transistor 53, a resistor-connected transistor 23, and a capacitor-connected transistor 24, which are connected to the node N1, are shown.

As represented in the upper fields of the table represented in FIG. 5, in a case where the reference voltage V(REF) is lower than the determination voltage Vs, the sub switching transistor 54 and the capacitor-connected transistor 24 are in the On state, and the main switching transistor 53 and the resistor-connected transistor 23 is in the Off state.

Accordingly, the sub current-source transistor 52 and the slow-start capacitor 17 are connected to the node N1.

Therefore, in the power supply circuit 1, the circuit represented in FIG. 4 is realized, and the slow-start capacitor 17 is charged by the second current I2.

On the other hand, as represented in the lower fields of the table represented in FIG. 5, in a case where the reference voltage V(REF) is higher than the determination voltage Vs, the main switching transistor 53 and the resistor-connected transistor 23 are in the On state, and the sub switching transistor 54 and the capacitor-connected transistor 24 are in the Off state.

Accordingly, the main switching transistor 53 and the resistor-connected transistor 23 are connected to the node N1.

Therefore, in the power supply circuit 1, the circuit represented in FIG. 2 is realized, and the resistor 16 generates a desired reference voltage V(REF) through the first current I1.

FIGS. 6A to 6F are timing charts of the startup operation of the power supply circuit 1 shown in FIG. 1.

Figure 6:
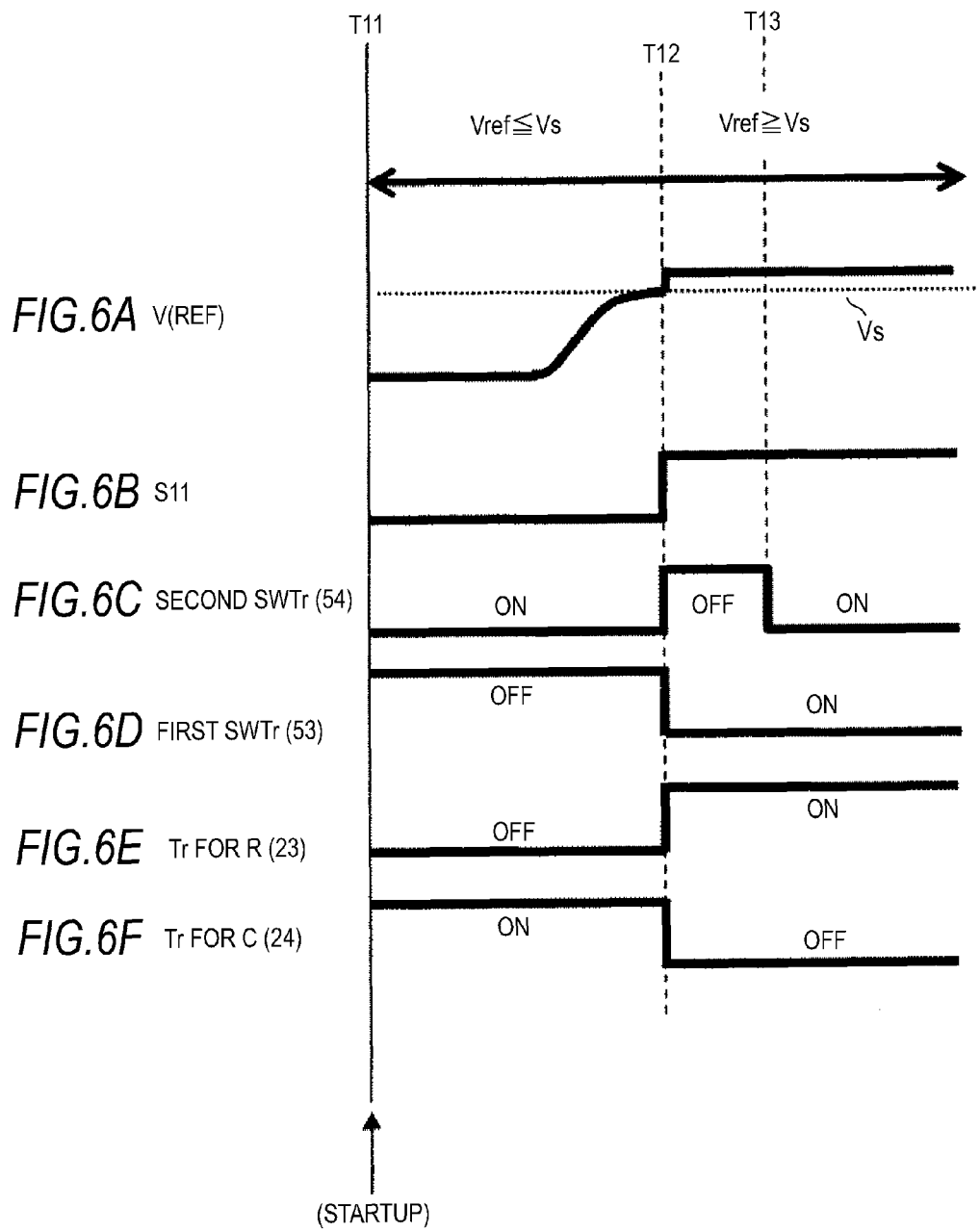
FIGS. 6A to 6F are timing charts of the startup operation of the power supply circuit shown in FIG. 1.

FIG. 6A is a waveform of the reference voltage V(REF) applied at the node N1. FIG. 6B is a waveform of the determination signal S22 that is output from the switching comparator 22. FIG. 6C is a waveform of a gate signal of the sub switching transistor 54. FIG. 6D is a waveform of a gate signal of the main switching transistor 53. FIG. 6E is a waveform of a gate signal of the resistor-connected transistor 23. FIG. 6F is a waveform of a gate signal of the capacitor-connected transistor 24.

When the power supply circuit 1 is started up at timing T11, the determination voltage generating unit 21 outputs a determination voltage Vs.

In the stopped state of the power supply circuit 1 and the state immediately after the startup of the power supply circuit 1, both the reference voltage V(REF) and the output voltage V(OUT) are 0 V (the ground level). Accordingly, the reference voltage V(REF) immediately after the startup is lower than the determination voltage Vs.

Accordingly, as illustrated in FIG. 6B, the switching comparator 22 outputs a determination signal S22 of the low level.

In addition, a signal of the high level is input to the sub switching transistor 54 so as to be in the On state as illustrated in FIG. 6C, and a signal of the high level is input to the main switching transistor 53 so as to be in the Off state as illustrated in FIG. 6D.

Accordingly, only the sub current-source transistor 52 is connected to the node N1, and the current output unit 15 supplies only the second current I2 to the node N1.

In addition, the resistor-connected transistor 23 is in the Off state as illustrated in FIG. 6E, and the capacitor-connected transistor 24 is in the On state as illustrated in FIG. 6F.

Accordingly, immediately after the startup, only the capacitor-connected transistor 24 is connected to the node N1, and the capacitor-connected transistor 24 is charged by the second current I2.

As a result, the charged voltage of the capacitor-connected transistor 24, that is, the reference voltage V(REF), as illustrated in FIG. 6A, is charged by the second current I2 that is lower than the first current I1 so as to slowly rise over time.

Then, when the reference voltage V(REF) exceeds the determination voltage Vs at timing T12, the switching comparator 22, as illustrated in FIG. 6B, changes the determination signal S22 from the low level to the high level.

In addition, a signal of the low level is input to the sub switching transistor 54 so as to be in the Off state as illustrated in FIG. 6C, and a signal of the low level is input to the main switching transistor 53 so as to be in the On state as illustrated in FIG. 6D.

Accordingly, only the main current-source transistor 51 is connected to the node N1, and the current output unit 15 supplies only the first current I1 to the node N1.

In addition, the resistor-connected transistor 23, as illustrated in FIG. 6E, is in the On state, and the capacitor-connected transistor 24 is in the Off state as illustrated in FIG. 6F.

Accordingly, when the reference voltage V(REF) exceeds the determination voltage Vs, only the resistor 16 is connected to the node N1, and the resistor 16 generates the reference voltage V(REF) through the first current I1.

Through the above-described operations, the power supply circuit 1 is started, and the main comparator 11 compares the input voltage V(IN) with the reference voltage V(REF) and controls the On/Off of the output transistor 41 based on a result of the comparison.

The output voltage V(OUT) is controlled such that the input voltage V(IN) is approximately the same as the reference voltage V(REF).

Thereafter, when the output voltage V(OUT) drops, and, for example, the input voltage V(IN) is below the reference voltage V(REF) at timing T13, the main comparator 11 changes the voltage difference signal S11 from the high level to the low level.

In the normal operation state after the startup, since the reference voltage V(REF) is higher than the determination voltage Vs, the switching comparator 22 typically outputs a determination signal S22 of the high level.

Accordingly, the power source logic circuit 26 directly outputs the level of the voltage difference signal S11 to the sub switching transistor 54.

In addition, when the voltage difference signal S11 is changed from the high level to the low level, the sub switching transistor 54 is in the On state as illustrated in FIG. 6C.

Accordingly, the first current I1 and the second current I2 flow through the resistor 16 so as to slightly raise the reference voltage V(REF).

In addition, as the voltage difference signal S11 is changed from the high level to the low level, the output transistor 41 is in the On state, and the smoothing capacitor 44 is charged. Accordingly, the input voltage V(IN) that is generated by the input voltage generating unit 14 based on the output voltage V(OUT) is raised.

Then, when the input voltage V(IN) exceeds the reference voltage V(REF) that is slightly raised, the main comparator 11 changes the voltage difference signal S11 from the low level to the high level.

Accordingly, the sub switching transistor 54 is in the Off state, and the reference voltage V(REF) is returned back to the original voltage according to the first current I1 only.

In the normal operation state, the power supply circuit 1 maintains the output voltage V(OUT) at a desired voltage through the above-described operations.

Accordingly, the power supply circuit 1 can generate a main power voltage that is stabilized at a predetermined voltage level and output the generated voltage from the power output terminal 13.

As above, according to the power supply circuit of the first embodiment, the slow-start capacitor 17 is charged by a current (the second current I2) that is lower than the reference current I(REF) during the operation when being started up.

Accordingly, even in a case where the capacitance of the slow-start capacitor 17 is set to be small, a long soft start period can be acquired.

Here, the additional area of the power supply circuit 1 for realizing the slow-start function will be described in a case where the current is restricted as in this embodiment and in a case where the current is not restricted.

Here, a case will be described in which the slow start time of 100 microseconds, for example, at the time of raising the voltage of the slow-start capacitor 17 from 0 volts to 1.2 volts is realized.

When the current is not restricted, the capacitance C1 of the slow-start capacitor 17 has a value that is acquired by using Equation 1 represented below.

In contrast to this, in a case where the current is restricted as in this embodiment, the capacitance C2 of the slow-start capacitor 17 has a value that is acquired by using Equation 2 represented below.

As is apparent from Equations 1 and 2 represented below, by restricting the current, the capacitance of the slow-start capacitor 17 can be decreased by 1/47 times.

$$C1 = I(REF) \times T/V\text{dif} = 75\mu A \times 100\mu s/1.2V = 6.25nF \qquad \text{Equation 1}$$

$$C2 = 1.6\ \mu A \times 100\mu s/1.2V = 133pF \qquad \text{Equation 2}$$

The area of the slow-start capacitor 17 of 6.25 nF in a case where the current is not restricted is about 3.1329 (=1.77 mm×1.77 mm) mm$^2$ in a process.

In contrast to this, the area in the case where the current is restricted is about 0.0708 mm$^2$ even in a case where additional circuits included in this embodiment are considered.

Here, the area of the slow-start capacitor 17 of 133 pF is calculated as about 0.0676 (=0.26 mm×0.26 mm) mm$^2$, and the area of the additional circuits is calculated as about 0.0032 (=0.08 mm×0.04 mm) mm$^2$.

As above, the area of the additional area in this embodiment is about 1/44 times the case where the current is not restricted, even in the case of considering the additional circuits.

According to the first embodiment, in a case where the input voltage V(IN) is lower than the reference voltage V(REF), the sub switching transistor 54 is in the On state, and the second current I2 together with the first current I1 is supplied to the resistor 16. In this case, the reference voltage V(REF) rises.

On the contrary, in a case where the input voltage V(IN) is higher than the reference voltage V(REF), the sub switching transistor 54 is in the Off state, and only the first current I1 is supplied to the resistor 16. In this case, the reference voltage V(REF) drops.

As above, according to the first embodiment, the reference voltage V(REF) increases or decreases in accordance with the input voltage V(IN), and accordingly, the main comparator 11 has hysteresis characteristics.

In addition, according to the first embodiment, for the startup, only the second current I2 is supplied to the slow-start capacitor 17 so as to generate the reference voltage V(REF), and accordingly, the reference current I(REF) at the time of startup is lower than that during the operation.

As above, the current output unit 15 has both functions including a function for serving as a current source so as to allow the main comparator 11 to have the hysteresis characteristics and a function for serving as a slow-start current source.

Thus, according to the first embodiment, the circuit configuration of the power supply circuit 1 is simplified more than that in a case where a plurality of circuits for the functions are separated arranged. Therefore, the size of the circuit can be suppressed.

In addition, according to the first embodiment, the current at the time of slow starting is restricted only to the second current I2, therefore a long slow start period can be acquired even in a case where the capacitance of the slow-start capacitor 17 is low.

Furthermore, according to the first embodiment, the slow-start capacitor 17 is disconnected from the node N1 during the operation after the startup.

Accordingly, both the first current I1 and the second current I2 flow through the resistor 16.

As a result, the reference voltage V(REF) during the operation can be changed at a high speed in accordance with the increase/decrease in the output voltage V(OUT) of the power supply circuit 1.

In other words, according to the first embodiment, the slow-start capacitor 17 is prevented from degrading the response characteristics of the main comparator 11 having the hysteresis characteristics.

<2. Second Embodiment>
[Configuration and Operation of Solid-State Imaging Apparatus 2]

Figure 7:
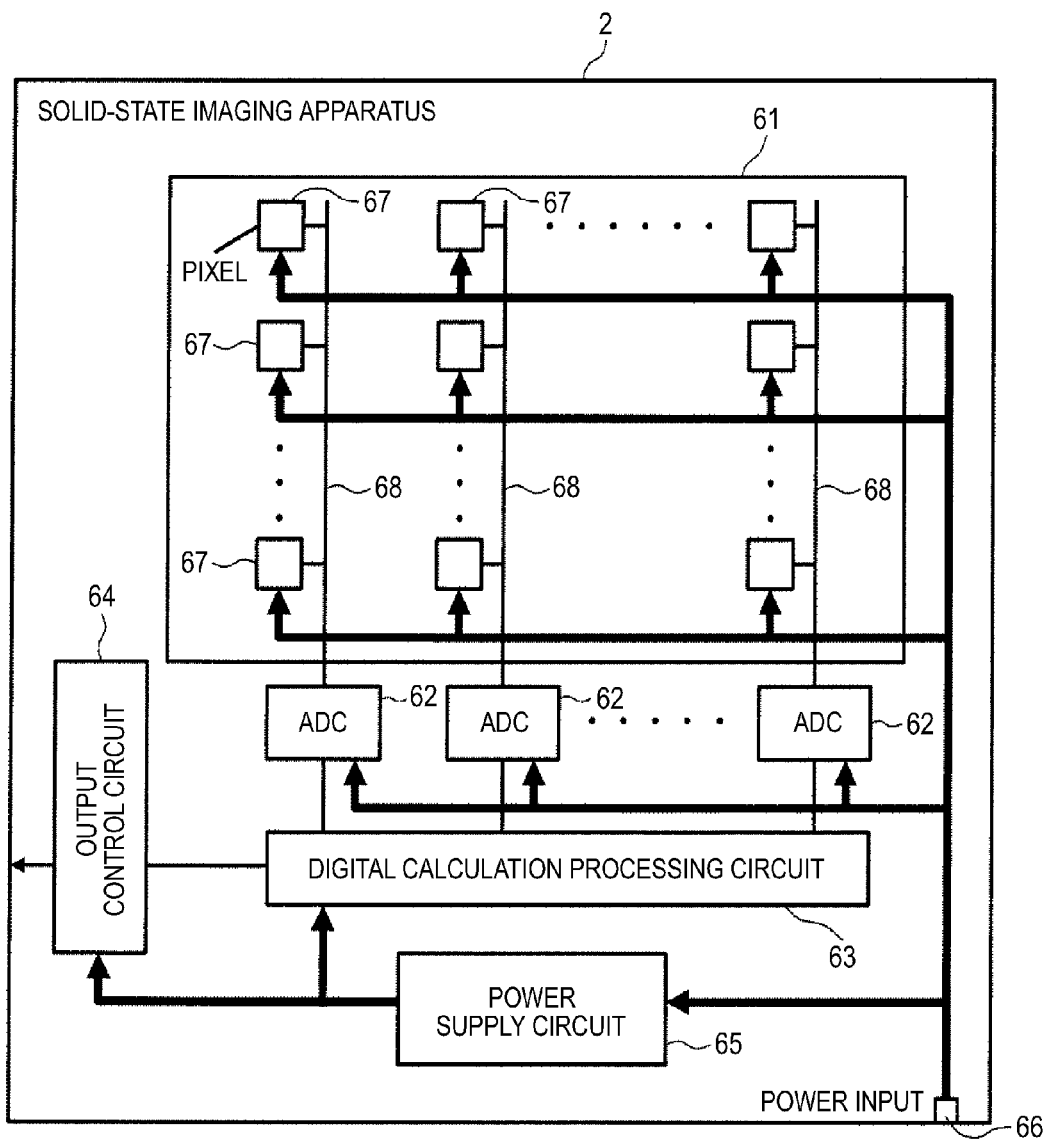
FIG. 7 is a block diagram of a solid-state imaging apparatus according to a second embodiment of the present invention.

FIG. 7 is a block diagram of a solid-state imaging apparatus 2 according to a second embodiment of the present invention.

The solid-state imaging apparatus 2 shown in FIG. 7 includes a pixel array unit 61, a plurality of column circuits 62, a digital calculation processing circuit 63, an output control circuit 64, a power supply circuit 65, and a power input terminal 66.

The circuit of the solid-state imaging apparatus 2 shown in FIG. 7, for example, is integrated on a semiconductor substrate, which is not shown in the figure, by employing the layout illustrated in FIG. 7.

In the pixel array unit 61, a plurality of pixel circuits 67 are two-dimensionally arranged.

Each pixel circuit 67 includes a photoelectric conversion device and outputs an analog pixel signal to an output signal line 68 that is disposed for each column.

The plurality of column circuits 62 are connected to a plurality of the output signal lines 68.

The column circuit 62, for example, amplifies an analog pixel signal that is input from the output signal line 68 by using a sense amplifier and converts the analog pixel signal into a digital value by performing a CDS (Correlated Double Sampling) process using a counter.

The digital calculation processing circuit 63 is connected to the plurality of column circuits 62, and a plurality of digital pixel signals are input thereto for each row.

The digital calculation processing circuit 63, for example, performs a calculation process for decreasing the number of pixels of an image to be less than the number of the pixel circuits 67 or the like as appropriate.

The output control circuit 64 is connected to the digital calculation processing circuit 63.

The output control circuit 64 outputs an image signal in which a plurality of digital pixel signals processed by the digital calculation processing circuit 63 are serially included in a predetermined order to the outside of the integrated circuit.

The power input terminal 66 is connected to the plurality of the pixel circuits 67 of the pixel array unit 61, the plurality of the column circuits 62, and the power supply circuit 65 through wirings of the semiconductor substrate.

An external voltage source not shown in the figure is connected to the power input terminal 66.

For example, a voltage of 2.7 V, which is demanded by the pixel circuits 67 and the column circuits 62, is supplied to the power input terminal 66.

The power supply circuit 65 is the power supply circuit 1 shown in FIG. 1.

The power supply circuit 65 is connected to the digital calculation processing circuit 63 and the output control circuit 64 through wirings of the semiconductor substrate.

The digital calculation processing circuit 63 and the output control circuit 64 are power-receiving circuits to which the output voltage of the power supply circuit 65 is supplied.

The power supply circuit 1 shown in FIG. 1 outputs a voltage that is lower than the power source voltage. Here, the power supply circuit 65, for example, outputs a voltage of 1.2 V that is lower than 2.7 V.

When a desired voltage is input from the power input terminal 66, the solid-state imaging apparatus 2 shown in FIG. 7 is started up.

The operations of the plurality of the pixel circuits 67 and the plurality of the column circuits 62 are started in accordance with external voltages input from the power input terminal 66.

In addition, the power supply circuit 65 generates a desired output voltage V(OUT) based on the external voltage input from the power input terminal 66 and supplies the generated output voltage V(OUT) to the digital calculation processing circuit 63 and the output control circuit 64.

Accordingly, the digital calculation processing circuit 63 and the output control circuit 64 start the operations thereof.

The plurality of the pixel circuits 67, the plurality of the column circuits 62, the digital calculation processing circuit 63, and the output control circuit 64 operate with the supplied power source voltages.

<3. Third Embodiment>
[Configuration and Operation of Solid-State Imaging Apparatus 2]

Figure 8:
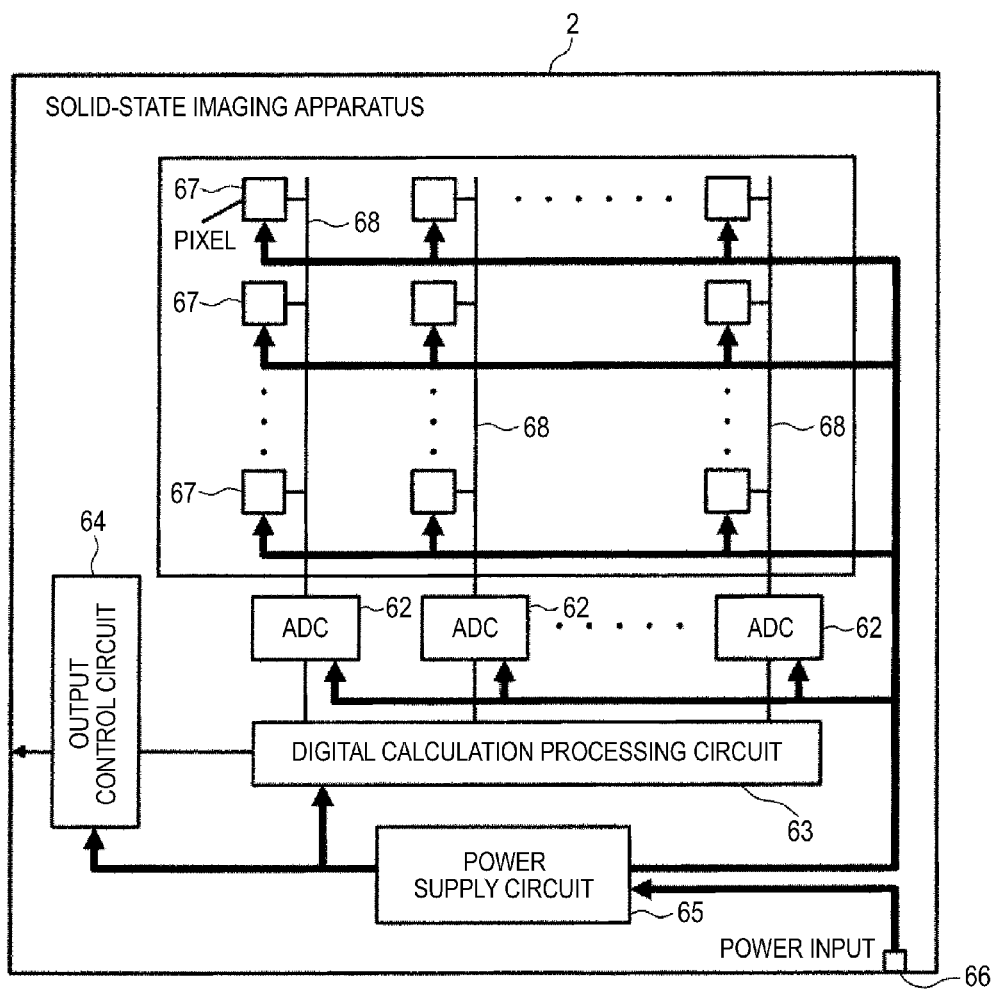
FIG. 8 is a block diagram of a solid-state imaging apparatus according to a third embodiment of the present invention.

FIG. 8 is a block diagram of a solid-state imaging apparatus 2 according to a third embodiment of the present invention.

In the solid-state imaging apparatus 2 shown in FIG. 8, a power input terminal 66 is connected to a power supply circuit 65 through wirings of a semiconductor substrate.

The power supply circuit 65 is connected to a plurality of pixel circuits 67 of a pixel array unit 61, a plurality of column circuits 62, a digital calculation processing circuit 63, and an output control circuit 64 through wirings of the semiconductor substrate.

The plurality of pixel circuits 67, the plurality of column circuits 62, the digital calculation processing circuit 63, and the output control circuit 64 are power-receiving circuits to which the output voltage of the power supply circuit 65 is supplied.

In the third embodiment, the power supply circuit 65, for example, may generate, for example, an output voltage V(OUT) of 2.7 V based on the voltage input to the power input terminal 66.

The configuration of the solid-state imaging apparatus 2 according to the third embodiment other than the above-described configuration is the same as that of the solid-state imaging apparatus 2 according to the second embodiment. Thus, the same reference numeral is assigned to each same configuration, and the description thereof is omitted.

In the solid-state imaging apparatus 2 according to the third embodiment, the plurality of the pixel circuits 67, the plurality of the column circuits 62, the digital calculation processing circuit 63, and the output control circuit 64 operate with a common power source voltage V(OUT).

<4. Fourth Embodiment>
[Configuration and Operation of Solid-State Imaging Apparatus 2]

Figure 9:
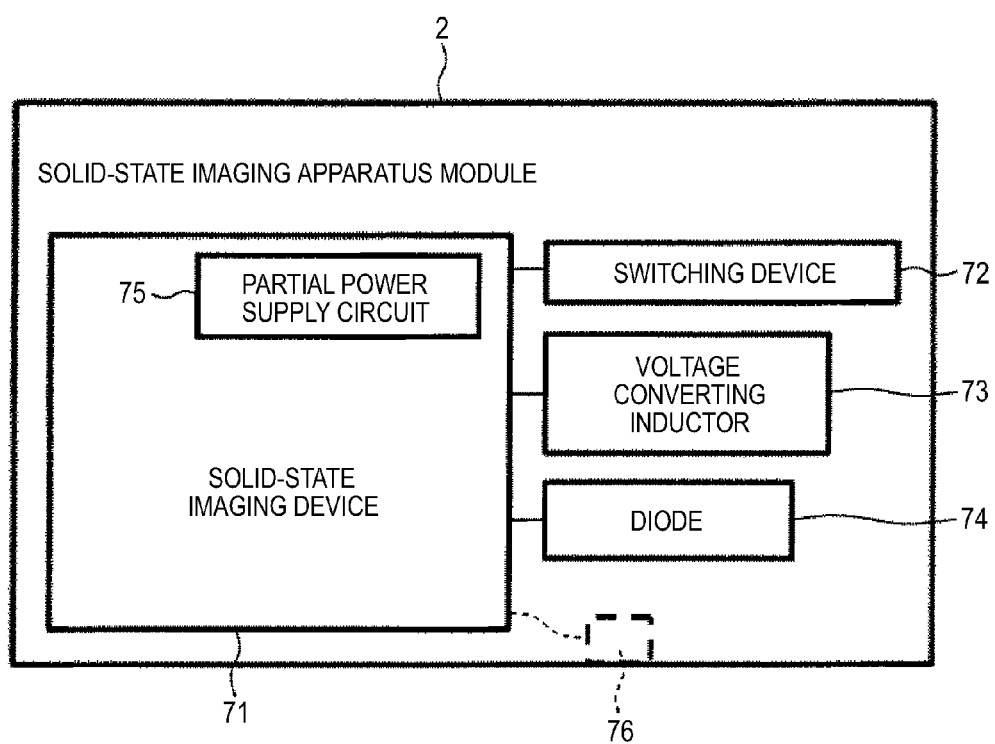
FIG. 9 is a block diagram of a solid-state imaging apparatus according to a fourth embodiment of the present invention.

FIG. 9 is a block diagram of a solid-state imaging apparatus 2 according to a fourth embodiment of the present invention.

The solid-state imaging apparatus 2 shown in FIG. 9 includes a solid-state imaging device 71, a switching device 72, a voltage converting inductor 73, and a diode 74. Such devices are integrated as a solid-state imaging module.

The solid-state imaging device 71, similarly to the solid-state imaging apparatus 2 according to the second embodiment shown in FIG. 7, includes a pixel array unit 61, a plurality of column circuits 62, a digital calculation processing circuit 63, an output control circuit 64, and a power input terminal 66.

The switching device 72, the voltage converting inductor 73, and the diode 74 are connected to the solid-state imaging device 71.

The solid-state imaging device 71 includes a partial power supply circuit 75.

The partial power supply circuit 75, the switching device 72, the voltage converting inductor 73, and the diode 74 configure the power supply circuit 1 shown in FIG. 1 and serve as a power supply circuit that is used for supplying the power source voltage to the digital calculation processing circuit 63 and the output control circuit 64.

In other words, the switching device 72 corresponds to the output transistor 41 shown in FIG. 1.

The voltage converting inductor 73 corresponds to the inductor 43 shown in FIG. 1.

The diode 74 corresponds to the diode 42 shown in FIG. 1.

In addition, the partial power supply circuit 75 includes a main comparator 11, a smoothing capacitor 44, a power output terminal 13, an input voltage generating unit 14, a current output unit 15, a resistor 16, and a slow-start capacitor 17 that are shown in FIG. 1.

Furthermore, as denoted by dotted lines in FIG. 9, it may be configured that an external connection terminal 76 is disposed in the solid-state imaging device 71, and the smoothing capacitor 44 is connected to the external connection terminal 76.

In the fourth embodiment, the switching device 72, the voltage converting inductor 73, and the diode 74 may be formed separately from the solid-state imaging device 71.

In addition, according to the fourth embodiment, an externally-attached smoothing capacitor 44 is connected to the external connection terminal 76, whereby the plurality of the pixel circuits 67, the plurality of the column circuits 62, the digital calculation processing circuit 63, and the output control circuit 64 operate with power source voltages respectively supplied thereto.

<5. Fifth Embodiment>
[Configuration and Operation of Power Supply Circuit 1]

Figure 10:
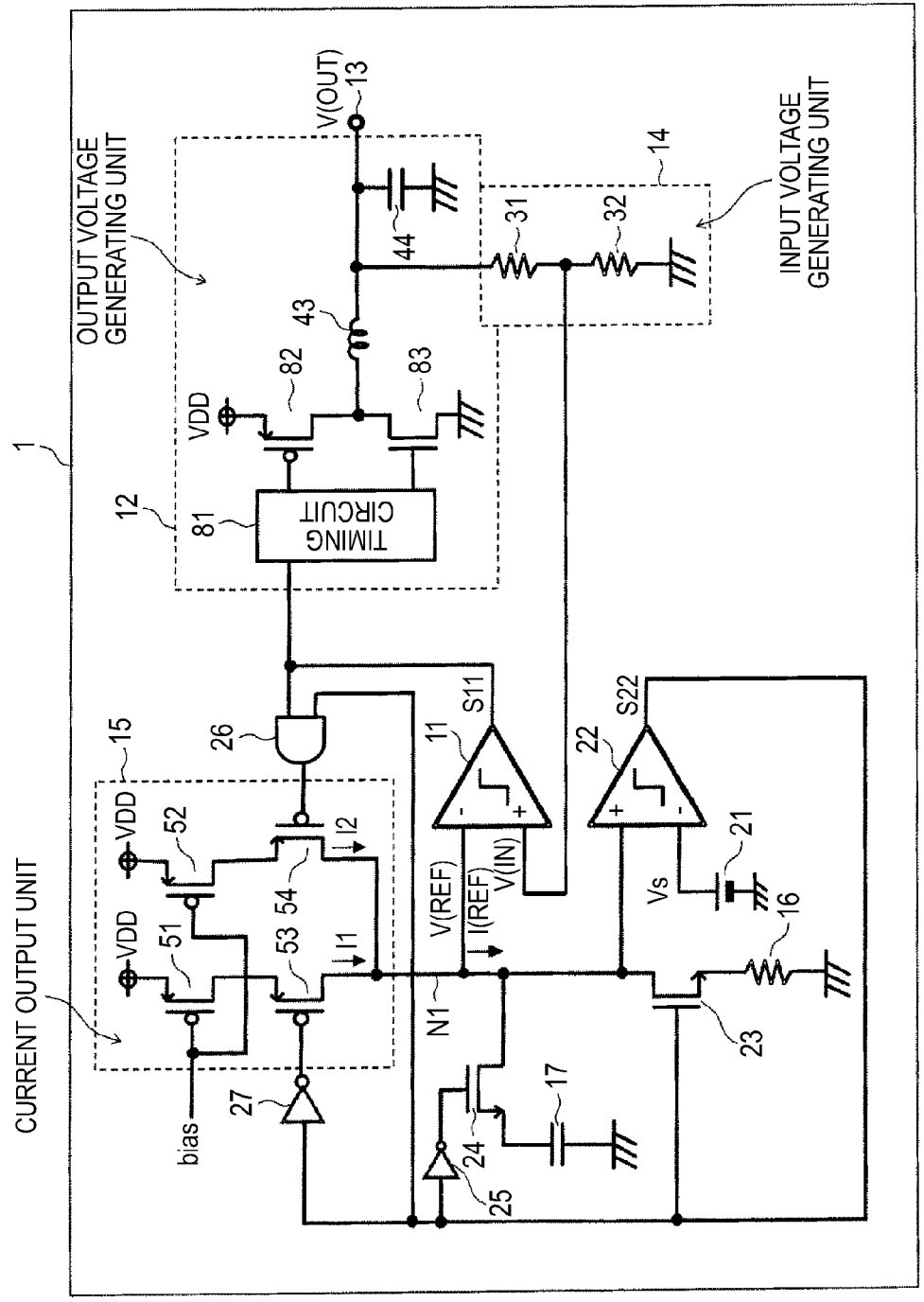
FIG. 10 is a block diagram of a solid-state imaging apparatus according to a fifth embodiment of the present invention.

FIG. 10 is a circuit diagram of a power supply circuit according to a fifth embodiment of the present invention.

The power supply circuit 1 shown in FIG. 10 includes a main comparator 11, an output voltage generating unit 12, a power output terminal 13, an input voltage generating unit 14, a current output unit 15, a resistor 16, and a slow-start capacitor 17.

The output voltage generating unit 12 includes a timing circuit 81, a PMOS transistor 82, an NMOS transistor 83, an inductor 43, and a smoothing capacitor 44.

The PMOS transistor 82 has the drain connected to the power source VDD of the substrate, the source connected to the NMOS transistor 83 and one end of the inductor 43, and the gate connected to the timing circuit 81.

The NMOS transistor 83 has the drain connected to the source of the PMOS transistor 82 and one end of the inductor 43, the source connected to the ground, and the gate connected to the timing circuit 81.

Accordingly, the PMOS transistor 82 and the NMOS transistor 83 are connected in series with respect to the power source VDD of the substrate.

The timing circuit 81 is connected to the main comparator 11.

In addition, the timing circuit 81 controls the switching of the PMOS transistor 82 and the NMOS transistor 83 based on a voltage difference signal S11 input from the main comparator 11.

For example, when the voltage difference signal S11 input from the main comparator 11 is in the low level, the timing circuit 81 alternately shifts the PMOS transistor 82 and the NMOS transistor 83 between the On state and the Off state.

A current flows from the power source VDD of the substrate to the smoothing capacitor 44 through the inductor 43 so as to charge the smoothing capacitor 44 in accordance with the switching control.

In addition, for example, when the voltage difference signal S11 is in the high level, the timing circuit 81 controls both the PMOS transistor 82 and the NMOS transistor 83 to be in the Off state.

The output voltage generating unit 12 generates an output voltage through the above-described control process using a synchronous rectification method.

<6. Sixth Embodiment>
[Configuration and Operation of Imaging Apparatus 3]

Figure 11:
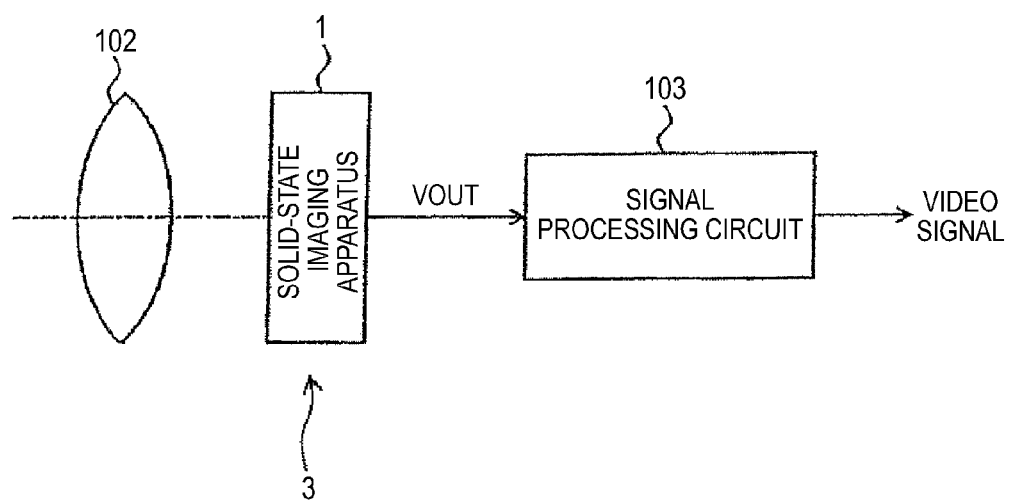
FIG. 11 is a block diagram of a solid-state imaging apparatus according to a sixth embodiment of the present invention.

FIG. 11 is a block diagram of an imaging apparatus 3 according to a sixth embodiment of the present invention.

The imaging apparatus 3 shown in FIG. 11 includes the solid-state imaging apparatus 2 according to any one of the second to fourth embodiments, an optical system 102, and a signal processing circuit 103. In addition, the power supply circuit 1 of the solid-state imaging apparatus 2 may be that according to the first embodiment, that according to the fifth embodiment, or that shown in FIG. 12 to be described below.

The imaging apparatus 3 shown in FIG. 11, for example, is a video camera, a digital still camera, or an electronic endoscopic camera.

The optical system 102 images image light (incident light) transmitted from an object in the solid-state imaging apparatus 2.

Accordingly, the incident light is converted into analog pixel signals corresponding to the incidence luminance in the plurality of pixel circuits 67 of the solid-state imaging apparatus 2.

The signal processing circuit 103 performs various signal processes for the output signal of the solid-state imaging apparatus 2 and outputs a resultant signal as a video signal.

In the imaging apparatus 3 shown in FIG. 11, the solid-state imaging apparatus 2 generates a plurality of pixel signals for an image that is imaged by the optical system 102 and outputs a plurality of pixel signals in serial for each scanning period.

The signal processing circuit 103 performs various signal processes for the plurality of pixel signals that are output from the solid-state imaging apparatus 2 in serial.

Although the above-described embodiments are preferred exemplary embodiments of the present invention, the present invention is not limited thereto, and various modifications or changes can be made within the scope not departing from the concept of the present invention.

Each of the above-described embodiments is an example in which an embodiment of the present invention is applied to the power supply circuit 1 using a hysteresis control method.

Other than that, for example, an embodiment of the present invention can be applied to a power supply circuit using a PWM control method, a comparator method, or the like, as long as the power supply circuit uses a reference voltage V(REF) that is compared with the output voltage V(OUT).

Figure 12:
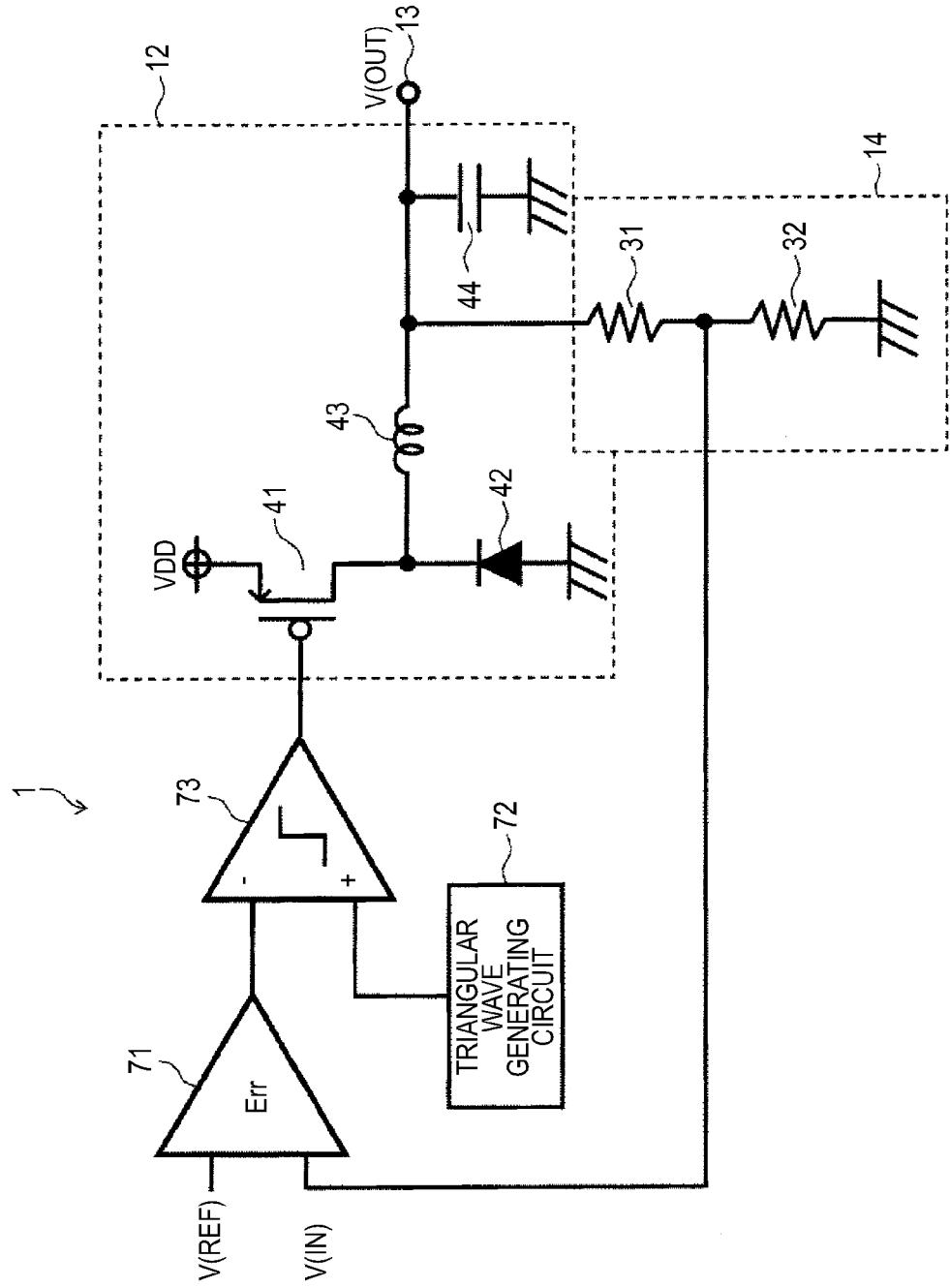
FIG. 12 is a diagram illustrating a PWM-control-type power supply circuit.

FIG. 12 is a diagram of a power supply circuit 1 using the PWM control method.

The power supply circuit 1 using the PWM control method, which is shown in FIG. 12, includes an error amplifier 71, a triangular wave generating circuit 72, a pulse generating comparator 73, an output voltage generating unit 12, a power output terminal 13, and an input voltage generating unit 14.

The error amplifier 71 compares the reference voltage V(REF) with the input voltage V(IN) and outputs an error signal that represents a voltage difference between the input voltage V(IN) and the reference voltage V(REF).

The triangular wave generating circuit 72 outputs a ramp signal of which the voltage level repeatedly changes in a predetermined range.

The pulse generating comparator 73 compares the error signal and the ramp signal, generates a pulse signal, for example, that is in the high level during a period in which the level of the ramp signal exceeds that of the error signal, and outputs the generated pulse signal to the output voltage generating unit 12.

In the power supply circuit 1 using the PWM control method, which is shown in FIG. 12, as a circuit that generates the reference voltage V(REF), the current output unit 15, the resistor 16, the slow-start capacitor 17, or the like shown in FIG. 1 can be used.

The power supply circuit 1 of each of the above-described embodiments is a step-down type that generates an output voltage V(OUT) that is lower than the power source voltage of the power supply circuit 1.

However, other than that, the power supply circuit according to an embodiment of the present invention may be a step-up type that generates an output voltage V(OUT) that is higher than the power source voltage of the power supply circuit 1.

In each of the above-described embodiments, the slow-start capacitor 17 is disposed in the power supply circuit or the integrated circuit as the solid-state imaging apparatus 2.

However, other than that, for example, it may be configured that a connection terminal is disposed in the integrated circuit, and the slow-start capacitor 17 is externally attached to the connection terminal.

The above-described sixth-embodiment is an example in which an embodiment of the present invention is applied to the solid-state imaging apparatus 2 of the imaging apparatus 3.

Other than that, for example, an embodiment of the present invention may be applied to the signal processing circuit 103 of the imaging apparatus 3.

Furthermore, an embodiment of the present invention can be applied to electronic apparatuses other than the imaging apparatus 3 such as a cellular phone, a computer apparatus, a PDA (Personal Data Assistant), and electronic notebook.

The present application contains subject matter related to that disclosed in Japanese Priority Patent Application JP 2010-120198 filed in the Japan Patent Office on May 26, 2010, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A power supply circuit comprising:
 a comparison unit that compares a reference voltage and an input voltage and outputs a voltage difference signal;
 an output voltage generating unit that generates an output voltage based on the voltage difference signal;
 an input voltage generating unit that generates the input voltage based on the output voltage;
 a current output unit that outputs a reference current;
 a resistor that generates the reference voltage in accordance with the reference current; and
 a capacitor that is connected to the resistor in parallel and is charged by the reference current,
 wherein the current output unit allows the reference current at the time of startup to be lower than the reference current during an operation;
 wherein the comparison unit includes a main comparator having one pair of first input terminals,
 a node to which the current output unit, the resistor, and the capacitor are connected is connected to one of the first input terminals out of the one pair of the first input terminals of the main comparator, the reference voltage is input to the one of the input terminals, the input voltage is input to the other of the first input terminals, and the main comparator outputs a voltage difference signal that changes in accordance with a level of the input voltage relative to the reference voltage,
 the current output unit includes
 a first current source that outputs a first reference current to the node;
 a second current source that outputs a second reference current that is lower than the first reference current to the node; and
 a first switching device that is connected between the node and the second current source, and
 the first switching device controls the reference voltage by, in accordance with the voltage difference signal, being in an On-state in a case where the input voltage is lower than the reference voltage and being in an Off-state in a case where the input voltage is higher than the reference voltage.

2. The power supply circuit according to claim 1, wherein the current output unit includes a second switching device that is connected between the node and the first current source, and
 the second switching device allows the reference current at the time of the startup so as to be lower than the reference current during the operation by being in the Off-state at the time of the startup.

3. The power supply circuit according to claim 1, further comprising:
 a third switching device that is connected between the node and the capacitor,
 wherein the third switching device disconnects the capacitor from the node during the operation by being in the On-state at the time of the startup and being in the Off-state during the operation.

4. The power supply circuit according to claim 1, further comprising:
 a switching comparator that has one pair of second input terminals; and
 a fourth switching device that is connected between the node and the resistor,
 wherein the node is connected to one of the second input terminals out of the one pair of the second input terminals, the reference voltage is input to the one of the second input terminals of the switching comparator, a determination voltage that is lower than the reference voltage in a case where the first current flows through the resistor is input to the other of the second input terminals, and the switching comparator outputs a determination signal that changes in accordance with the level of the reference voltage relative to the determination voltage, and
 the fourth switching device disconnects the resistor from the node at the time of the startup by, in accordance with the determination signal, being in the On-state in a case where the reference voltage is higher than the determination voltage and being in the Off-state in a case where the reference voltage is lower than the determination voltage.

5. The power supply circuit according to claim 4, further comprising:
a first logic circuit, to which the voltage difference signal of the main comparator and the determination signal of the switching comparator are input, outputting a control signal to the first switching device; and
a second logic circuit, to which the determination signal of the switching comparator is input, outputting a control signal to the second switching device.

6. The power supply circuit according to claim 1, wherein the output voltage generating unit includes
an output switching device that performs a switching operation in accordance with the voltage difference signal;
a diode that has a cathode being connected to the output switching device;
an inductor that has one end being connected to the output switching device; and
a smoothing capacitor that is connected to the other end of the inductor and generates the output voltage.

7. The power supply circuit according to claim 1, wherein the output voltage generating unit includes
a first switching device and a second switching device that are connected in series with respect to a power source;
an inductor that has one end being connected to a connection node of the first switching device and the second switching device;
a smoothing capacitor that is connected to the other end of the inductor and generates the output voltage; and
a timing circuit, to which the voltage difference signal is input, controlling switching of the first switching device and the second switching device in accordance with the voltage difference signal.

8. An integrated circuit device comprising:
a power supply circuit that outputs an output voltage; and
a power-receiving circuit to which the output voltage is fed,
wherein the power supply circuit includes
a comparison unit that compares a reference voltage and an input voltage and outputs a voltage difference signal,
an output voltage generating unit that generates an output voltage based on the voltage difference signal,
an input voltage generating unit that generates the input voltage based on the output voltage,
a current output unit that outputs a reference current,
a resistor that generates the reference voltage in accordance with the reference current, and
a capacitor that is connected to the resistor in parallel and is charged by the reference current, wherein
the current output unit allows the reference current at the time of startup to be lower than the reference current during an operation.
wherein the comparison unit includes a main comparator having one pair of first input terminals,
a node to which the current output unit, the resistor, and the capacitor are connected is connected to one of the first input terminals out of the one pair of the first input terminals of the main comparator, the reference voltage is input to the one of the input terminals, the input voltage is input to the other of the first input terminals, and the main comparator outputs a voltage difference signal that changes in accordance with a level of the input voltage relative to the reference voltage,
the current output unit includes
a first current source that outputs a first reference current to the node;
a second current source that outputs a second reference current that is lower than the first reference current to the node; and
a first switching device that is connected between the node and the second current source, and
the first switching device controls the reference voltage by, in accordance with the voltage difference signal, being in an On-state in a case where the input voltage is lower than the reference voltage and being in an Off-state in a case where the input voltage is higher than the reference voltage.

9. The integrated circuit according to claim 8, wherein the output voltage generating unit includes
an output switching device that performs a switching operation in accordance with the voltage difference signal;
a diode that has a cathode being connected to the output switching device;
an inductor that has one end being connected to the output switching device; and
an external connection terminal connected to the other end of the inductor, to which a smoothing capacitor can be connected.

10. The integrated circuit according to claim 8, wherein the output voltage generating unit includes
a first switching device and a second switching device that are connected in series with respect to a power source;
an inductor that has one end being connected to a connection node of the first switching device and the second switching device;
a smoothing capacitor that is connected to the other end of the inductor and generates the output voltage; and
a timing circuit, to which the voltage difference signal is input, controlling switching of the first switching device and the second switching device in accordance with the voltage difference signal.

11. A solid-state imaging apparatus comprising:
a pixel array unit, in which a plurality of pixel circuits are two-dimensionally arranged, that outputs analog pixel signals of the pixel circuits;
a column circuit that converts the analog pixel signals into digital pixel signals;
a digital processing unit that performs a digital process for the digital pixel signals;
an output control unit that outputs the digital pixel signals for which the digital process has been performed; and
a power supply circuit that outputs an output voltage to at least one of the pixel array unit, the column circuit, the digital processing unit, and the output control unit,
wherein the power supply circuit includes
a comparison unit that compares a reference voltage and an input voltage and outputs a voltage difference signal,
an output voltage generating unit that generates an output voltage based on the voltage difference signal,
an input voltage generating unit that generates the input voltage based on the output voltage,
a current output unit that outputs a reference current,
a resistor that generates the reference voltage in accordance with the reference current, and a capacitor that is connected to the resistor in parallel and is charged by the reference current, wherein the current output unit allows the reference current at the time of startup to be lower than the reference current during an operation, wherein the comparison unit includes a main comparator having one pair of first input terminals, a node to which the current output unit, the resistor, and the capacitor are connected is connected to one of the first input terminals out of the one pair of the first input terminals of the main comparator, the reference voltage is input to the one of the input terminals, the input voltage is input to the other of the first input terminals, and the main comparator outputs a voltage difference signal that changes in accordance with a level of the input voltage relative to the reference voltage, the current output unit includes a first current source that outputs a first reference current to the node;

a second current source that outputs a second reference current that is lower than the first reference current to the node; and a first switching device that is connected between the node and the second current source, and the first switching device controls the reference voltage by, in accordance with the voltage difference signal, being in an On-state in a case where the input voltage is lower than the reference voltage and being in an Off-state in a case where the input voltage is higher than the reference voltage.

12. The solid-state imaging apparatus according to claim 11, further comprising:

a power input terminal that is used for power-feeding the pixel array unit and the column circuit, wherein the power supply circuit supplies an output voltage acquired by stepping down the input voltage of the power input terminal to the digital processing unit and the output control unit.

13. An electronic apparatus comprising:

a power supply circuit that outputs an output voltage; and a power-receiving circuit to which the output voltage is fed, wherein the power supply circuit includes a comparison unit that compares a reference voltage and an input voltage and outputs a voltage difference signal, an output voltage generating unit that generates an output voltage based on the voltage difference signal, an input voltage generating unit that generates the input voltage based on the output voltage, wherein the input voltage generating unit includes first and second voltage dividing resistors, a current output unit that outputs a reference current, a resistor that generates the reference voltage in accordance with the reference current, and a capacitor that is connected to the resistor in parallel and is charged by the reference current, wherein the current output unit allows the reference current at the time of startup to be lower than the reference current during an operation, wherein the comparison unit includes a main comparator having one pair of first input terminals, a node to which the current output unit, the resistor, and the capacitor are connected is connected to one of the first input terminals out of the one pair of the first input terminals of the main comparator, the reference voltage is input to the one of the input terminals, the input voltage is input to the other of the first input terminals, and the main comparator outputs a voltage difference signal that changes in accordance with a level of the input voltage relative to the reference voltage, the current output unit includes a first current source that outputs a first reference current to the node;

a second current source that outputs a second reference current that is lower than the first reference current to the node; and a first switching device that is connected between the node and the second current source, and the first switching device controls the reference voltage by, in accordance with the voltage difference signal, being in an On-state in a case where the input voltage is lower than the reference voltage and being in an Off-state in a case where the input voltage is higher than the reference voltage.

* * * * *